United States Patent
Nambu et al.

(10) Patent No.: US 6,316,572 B1
(45) Date of Patent: *Nov. 13, 2001

(54) CURABLE COMPOSITION FOR COATINGS, COATED ARTICLES AND RESIN COMPOSITION FOR COATINGS

(75) Inventors: Toshiro Nambu, Kobe; Seigo Nakamura, Takasago; Naotami Ando, Kako-gun, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,189

(22) Filed: Dec. 27, 1999

(30) Foreign Application Priority Data

Dec. 25, 1998 (JP) .................................................. 10-369892

(51) Int. Cl.⁷ .................................................... C08G 77/04
(52) U.S. Cl. .............................. 528/33; 528/34; 525/100; 525/105; 525/106; 428/447; 428/413
(58) Field of Search ..................................... 428/413, 414, 428/416, 418, 446, 447, 450; 525/100, 105, 106, 33, 34

(56) References Cited

U.S. PATENT DOCUMENTS

| 4,681,811 | * | 7/1987 | Simpson et al. ....................... 428/413 |
| 5,609,918 | | 3/1997 | Yamaguchi et al. .............. 427/407.1 |

FOREIGN PATENT DOCUMENTS

| 0 921 167 A1 | 6/1999 | (EP) . |
| WO98/07797 | 2/1998 | (WO) . |

OTHER PUBLICATIONS

JP 7331136A, Dec. 19, 1995, abstract.

* cited by examiner

Primary Examiner—Paul Thibodeau
Assistant Examiner—Monique R. Jackson
(74) Attorney, Agent, or Firm—Connolly Bove Lodge & Hutz

(57) ABSTRACT

The present invention has its objects to provide a curable composition for coatings which can provide coatings or paint films excellent in acid resistance, scratch resistance, stain resistance and heat curability, with very good weather resistance and appearance; and coated articles and a resin composition obtained from the curable composition. The curable composition comprises: (A) a resin (A-1) obtained by mixing an epoxy group-containing compound (x) component and a carboxyl group-containing compound (y) component and/or a resin (A-2) based on an epoxy group-containing and carboxyl group-containing vinyl copolymer (z) component; (B) a vinyl copolymer whose main chain substantially consists of a vinyl copolymer chain and which has, within the molecule thereof, at least one hydrolyzable silyl group bound to a carbon atom as represented by the general formula (I):

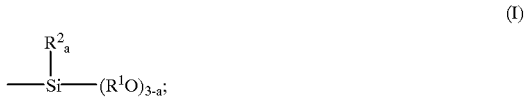

(I)

and (C) a silicon compound represented by the general formula (VII):

$(R^3O)_{4-b}SiR^4{}_b$ (VII)

and/or a partial hydrozylate condensate thereof.

19 Claims, No Drawings

CURABLE COMPOSITION FOR COATINGS, COATED ARTICLES AND RESIN COMPOSITION FOR COATINGS

TECHNICAL FIELD

The present invention relates to a curable composition for coatings, which is preferably applied to, for example, automobiles, industrial equipment, steel furniture, building interior and exterior, electric appliances, various plastics products and the like, and to a coated article obtained from said curable composition for coatings. More particularly, it relates to a curable composition for coatings which can provide good acid resistance, scuff or scratch resistance, stain resistance, appearance and heat curability, among others, very good weather resistance and are particularly suited for top coat compositions for automobiles, to a coated article obtained from said curable composition for coatings and to a resin composition for coatings.

BACKGROUND ART

So far, coating compositions mainly comprising a melamine resin, such as an alkyd melamine resin or acrylic melamine resin, have been used in coating automobiles, industrial equipment, steel furniture, building interior and exterior, electric appliances, various plastics products and the like.

However, such coating compositions mainly comprising a melamine resin have some problems: a harmful formalin is generated in the step of curing and, since cured coatings are poor in acid resistance, they are affected by acid rain. In particular, the acid rain problem has been aggravated owing to recent air pollution and phenomena such as etching, whitening and staining or spotting of coatings or paint films have been encountered.

To solve the above problems, melamine resin-free coating compositions have already been proposed (e.g. JP Kokai H03-287650 and JP Kokai H02-45577). In such coating compositions, ester bonds resulting from the reaction of acid groups and epoxy groups serve as crosslinking sites and, therefore, said coating compositions are advantageous, as compared with the coating compositions mainly comprising a melamine resin, in that they can form coatings having good acid resistance. However, it has now been found that once the coatings which were formed from said coating compositions by reacting an acid group with an epoxy group is stained, the stains tend to be difficult to remove, although said compositions give coatings having good acid resistance. In particular, the tendency is more remarkable with tint or weak color coatings. Thus, from the viewpoint of good appearance, easy cleaning, reduced number of cleanings, or the like, improvements in stain resistance are desired.

Furthermore, in top coat finishing of automobiles, improvements in finish appearance are earnestly desired.

When it is demanded that coated articles have high quality appearance, it is a usual practice to further incorporate a leveling agent, which is an appearance modifier, in top coat paints. At present, without addition of a leveling agent, none of the commercial paints or coating compositions can give a satisfactory finish appearance or cope with the high quality appearance requirement.

When a leveling agent is added to a composition for coatings capable of providing stain resistance, it is possible that the stain resistance of the coating composition decreases.

WO 98/07797 discloses a curable composition (α) for coatings which comprises an epoxy group-containing resin (A) component, a carboxyl group-containing compound (B) component and a silicate (C) component as well as a composition derived from said composition by introducing a hydrolyzable silyl group into the (A) component, namely a curable composition (β) for coatings which comprises a hydrolyzable silyl group- and epoxy group-containing resin (A) component, a carboxyl group-containing compound (B) component and a silicate (C) component. However, though such compositions indeed provide good stain resistance, the stain resistance may be lowered by certain additives added in the step of paint or coating preparation. Also in cases where a leveling agent is added as the additive, the same problem may be encountered and it is necessary to select a leveling agent which will not lessen the stain resistance. Alternatively, a paint or coating is earnestly desired which is capable of providing a good appearance without adding any leveling agent, hence capable of retaining the stain resistance without any reduction in stain resistance due to the addition of a leveling agent.

SUMMARY OF THE INVENTION

In view of the above state of the art, the present invention has for its object to provide a curable composition for coatings which can provide coatings or paint films excellent in acid resistance, scratch resistance, stain resistance and heat curability, among others, with very good weather resistance and appearance. In particular, the curable composition for coatings of the present invention can preferably be used in top coat paint compositions for automobiles. In addition, the present invention provides a coated articles obtained from said curable composition for coatings and a resin composition for coatings.

The present invention provides a curable composition for coatings which comprises:

a component (A) consisting of a resin (A-1) obtained by mixing an epoxy group-containing compound (x) component and a carboxyl group-containing compound (y) component and/or a resin (A-2) based on an epoxy group- and carboxyl group-containing vinyl copolymer (z) component, a component (B) consisting of a vinyl copolymer whose main chain substantially consists of a vinyl copolymer chain and which has, within the molecule thereof, at least one hydrolyzable silyl group bound to a carbon atom as represented by the following general formula (I):

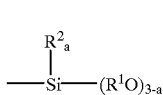

(I)

[wherein $R^1$ represents a hydrogen atom or an alkyl group containing 1 to 10 carbon atoms, $R^2$ represents a hydrogen atom or a monovalent hydrocarbon group selected from among an alkyl group containing 1 to 10 carbon atoms, an aryl group containing 6 to 10 carbon atoms and an aralkyl group containing 7 to 10 carbon atoms and a represents an integer of 0 to 2], at one main chain terminus and/or on a side chain, and a component (C) consisting of a silicon compound represented by the following general formula (VII):

$$(R^3O)_{4-b}SiR^4{}_b \qquad (VII)$$

[wherein $R^3$ represents a hydrogen atom or an alkyl group containing 1 to 10 carbon atoms, an aryl group containing 6 to 10 carbon atoms or an aralkyl group containing 7 to 10 carbon atoms and the $R^3$ groups may be the same or different, $R^4$ represents an alkyl group containing 1 to 10 carbon atoms, an aryl group containing 6 to 10 carbon atoms or an aralkyl group containing 7 to 10 carbon atoms and when there is a plurality of $R^4$ groups, they maybe the same or different, and b represents an integer of 0 to 2], and/or a partial hydrolyzate condensate thereof.

The curable composition for coatings of the present invention preferably comprises 100 parts by weight of the component (A), 1 to 100 parts by weight of the component (B) and 1 to 100 parts by weight of the component (C).

Said (x) component preferably contains at least two epoxy groups per molecule and has an epoxy equivalent of 200 to 2,000 g/mole. It preferably contains at least one hydroxy group per molecule and has a hydroxy equivalent of 500 to 7,000 g/mole. Furthermore, it preferably contains at least one carboxyl group per molecule.

Said (y) component is preferably a vinyl copolymer ((y)-i component) containing, on an average, two or more carboxyl groups per molecule.

Said (y)-i component preferably contains at least two epoxy groups per molecule and has an epoxy equivalent of 200 to 2,000 g/mole. It preferably contains at least one hydroxy group per molecule and has a hydroxy equivalent of 500 to 7,000 g/mole.

The (y) component is preferably an oligomer compound ((y)-ii component) containing at least two carboxyl groups per molecule and having a molecular weight of not more than 2,000.

Said (y)-ii component is preferably prepared by subjecting a polyol compound and an acid anhydride compound to half esterification.

The (z) component preferably contains at least one carboxyl group and at least two epoxy groups per molecule and has an epoxy equivalent of 200 to 2,000 g/mole.

The component (B) mentioned above preferably contains at least one hydroxy group per molecule and has a hydroxy equivalent of 500 to 7,000 g/mole. It preferably contains at least one epoxy group per molecule and has an epoxy equivalent of 200 to 2,000 g/mole.

The component (C) mentioned above preferably consists of a tetraalkyl silicate and/or a partial hydrolyzate condensate thereof.

It is preferred that the curable composition for coatings of the present invention further comprises a curing catalyst component (D) in an amount of 0.001 to 10 parts by weight per 100 parts by weight, on the solid matter basis, of the sum total of the above-mentioned components (A), (B) and (C).

In the component (A) mentioned above, the epoxy group to carboxyl group mole ratio is preferably such that the epoxy group occurs in an amount of 0.2 to 5 moles per mole of the carboxyl group.

In another aspect, an coated article provided with a coating comprising a metallic powder and/or color pigment and further provided thereon with a top coat clear coating comprising, as the main component, the curable composition for coatings of the present invention also falls under the present invention.

In a further aspect, a resin composition for coatings falls under the present invention which is intended for producing a curable composition for coatings by blending with a composition for coatings which comprises a component (A) consisting of a resin (A-1) obtained by mixing an epoxy group-containing compound (x) component with a carboxyl group-containing compound (y) component and/or a resin (A-2) based on an epoxy group- and carboxyl group-containing vinyl copolymer (z) component, wherein said resin composition for coatings comprises a component (B) consisting of a vinyl copolymer whose main chain substantially consists of a vinyl copolymer chain and which has, within the molecule thereof, at least one hydrolyzable silyl group bound to a carbon atom as represented by the following general formula (I):

(I)

[wherein $R^1$ represents a hydrogen atom or an alkyl group containing 1 to 10 carbon atoms, $R^2$ represents a hydrogen atom or a monovalent hydrocarbon group selected from among an alkyl group containing 1 to 10 carbon atoms, an aryl group containing 6 to 10 carbon atoms and an aralkyl group containing 7 to 10 carbon atoms and a represents an integer of 0 to 2], at one main chain terminus and/or on a side chain, and a component (C) consisting of a silicon represented by the following general formula (VII):

$(R^3O)_{4-b}SiR^4_b$ (VII)

[wherein $R^3$ represents a hydrogen atom or an alkyl group containing 1 to 10 carbon atoms, an aryl group containing 6 to 10 carbon atoms or an aralkyl group containing 7 to 10 carbon atoms and the $R^3$ groups may be the same or different, $R^4$ represents an alkyl group containing 1 to 10 carbon atoms, an aryl group containing 6 to 10 carbon atoms or an aralkyl group containing 7 to 10 carbon atoms and when there is a plurality of $R^4$ groups, they may be the same or different, and b represents an integer of 0 to 2], and/or a partial hydrolyzate condensate thereof.

When said resin composition for coatings is used, it is preferable that 1 to 100 parts by weight of the component (B) and 1 to 100 parts by weight of the component (C) are blended with said composition for coatings comprising 100 parts by weight of the component (A).

DETAILED DESCRIPTION OF THE INVENTION

First, the component (A) is described.

The component (A) to be used in accordance with the present invention is a coating composition capable of forming a cured coating or paint film by the reaction of the epoxy group-containing compound (x) component and the carboxyl group-containing compound (y) component.

The epoxy group-containing compound (x) component as so referred to in the present specification does not have, within the molecule thereof, any hydrolyzable silyl group bound to a carbon atom as represented by the above general formula (I).

As said (x) component, there may be mentioned an epoxy group-containing resin. The epoxy group-containing resin is constituted of an epoxy group-containing vinyl monomer-derived unit and another copolymerizable vinyl monomer-derived unit.

The epoxy group-containing vinyl monomer species is not particularly restricted but includes, as examples, those species represented by the following general formulas (1) to (14):

(1) 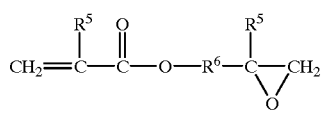

(2) 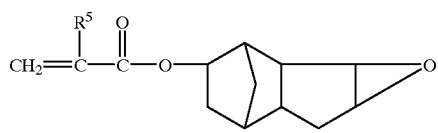

(3) 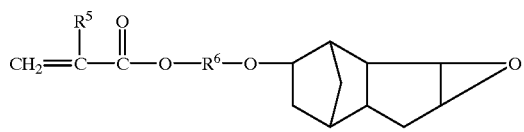

(4) 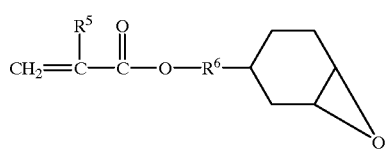

(5) 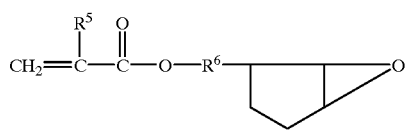

(6) 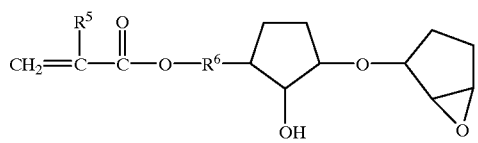

(7) 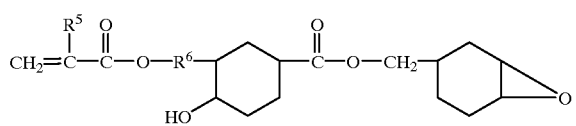

(8) 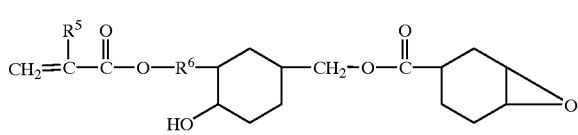

(9) 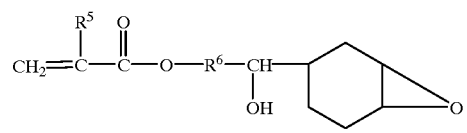

(10) 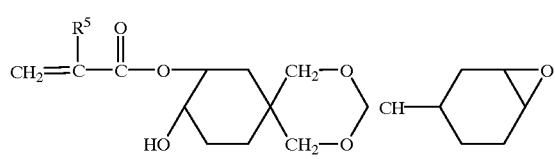

-continued

(11) 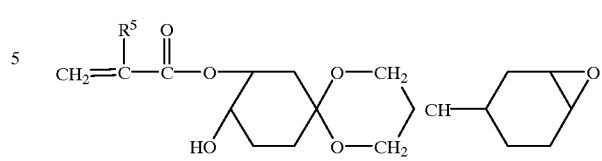

(12) 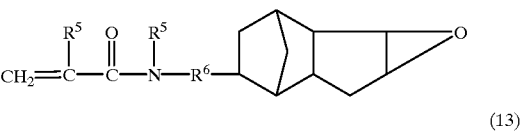

(13) 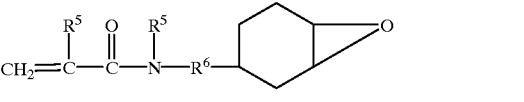

(14) 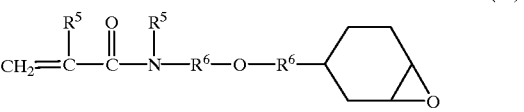

In each of the above formulas, $R^5$ represents a hydrogen atom or a methyl group and $R^6$ represents a divalent aliphatic saturated hydrocarbon group containing 1 to 6 carbon atoms.

Such epoxy group-containing vinyl monomer is preferably used in an amount of 10 to 70% by weight, more preferably 20 to 60% by weight, based on the total weight of the comonomer components. When the amount of said monomer is less than 10% by weight, the composition obtained tends to fail to show sufficient curability or develop acid resistance. When it is in excess of 70% by weight, the compatibility with other resins and the weather resistance tend to decrease.

The other copolymerizable vinyl monomer is not particularly restricted but includes, among others, unsaturated polycarboxylic acid esters such as methyl (meth)acrylate, ethyl (meth)acrylate, butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, isobornyl (meth)acrylate, stearyl (meth)acrylate, benzyl (meth)acrylate, cyclohexyl (meth)acrylate, trifluoroethyl (meth)acrylate, pentafluoropropyl (meth)acrylate, diesters and half esters of unsaturated polycarboxylic acids (e.g. maleic acid, fumaric acid, itaconic acid) with straight or branched alcohols containing 1 to 20 carbon atoms; aromatic hydrocarbon vinyl compounds such as styrene, α-methylstyrene, chlorostyrene and sodium styrenesulfonate; vinyl esters and allyl compounds such as vinyl acetate, vinyl propionate and diallyl phthalate; nitrile group-containing vinyl compounds such as (meth)acrylonitrile; basic nitrogen-containing vinyl compounds such as dimethylaminoethyl (meth)acrylate, diethylaminoethyl (meth)acrylate, vinylpyridine and aminoethyl vinyl ether; amide group-containing vinyl compounds such as (meth)acrylamide, itaconic acid diamide, α-ethyl(meth)acrylamide, crotonamide, maleic acid diamide, fumaric acid diamide, N-vinylpyrrolidone, N-butoxymethyl(meth)acrylamide, N,N-dimethylacrylamide, N-methylacrylamide and acryloylmorpholine; and other vinyl compounds such as vinyl methyl ether, vinyl chloride, vinylidene chloride, chloroprene, propylene, butadiene, isoprene, maleimide and N-vinylimidazole.

Preferred as the method of synthesizing the epoxy group-containing resin (x) component is the solution polymerization method using a peroxide radical initiator, such as tert-butyl peroxyacetate, or an azo radical initiator, such as azobisisobutyronitrile, because of ease of synthesis.

If necessary, the molecular weight may be adjusted using a chain transfer agent such as n-dodecyl mercaptan, tert-dodecyl mercaptan, n-butyl mercaptan, γ-mercaptopropyltrimethoxysilane, γ-mercaptopropyltriethoxysilane, γ-mercaptopropylmethyldimethoxysilane or γ-mercaptopropylmethyldiethoxysilane.

As the polymerization solvent to be used in the above solution polymerization, there may be mentioned such inert solvents as hydrocarbons (e.g. toluene, xylene, n-hexane, cyclohexane), acetate esters (e.g. ethyl acetate, butyl acetate), alcohols (methanol, ethanol, isopropanol, n-butyl alcohol), ethers (e.g. ethylcellosolve, butylcellosolve, cellosolve acetate) and ketones (e.g. methyl ethyl ketone, ethyl acetoacetate, acetylacetone, diacetone alcohol, methyl isobutyl ketone, acetone). Any other inert solvent may also be used without any particular limitation.

The (x) component preferably has a number average molecular weight of 1,000 to 20,000, more preferably 2,000 to 15,000, still more preferably 3,000 to 10,000, because of the heat curability and the durability.

It is further desirable that the (x) component have at least two epoxy groups per molecule.

From the viewpoint of curability, weather resistance, high coat finish, or the like, it is preferred that such resin have an epoxy equivalent of 200 to 2,000 g/mole, more preferably 230 to 1,000 g/mole, still more preferably 250 to 750 g/mole.

The above (x) component may contain a hydroxy group or groups. The (x) component which also has a hydroxy group or groups can be prepared from a hydroxy group-containing vinyl monomer-derived unit, the above-mentioned epoxy group-containing vinyl monomer-derived unit and the above-mentioned other copolymerizable vinyl monomer-derived unit, for example, by solution polymerization using a radical initiator.

The hydroxy group-containing vinyl monomer species is not particularly restricted but includes, among others, 2-hydroxyethyl (meth)acrylate, 2-hydroxypropyl (meth)acrylate, 2-hydroxybutyl (meth)acrylate, 4-hydroxybutyl (meth)acrylate, 2-hydroxyethyl vinyl ether, N-methylol (meth)acrylamide, 4-hydroxystyrene vinyltoluene, TOAGOSEI's Aronix 5700, 4-hydroxystyrene, NIPPON SHOKUBAI's HE-10, HE-20, HP-1 and HP-20 (each being a hydroxy group-terminated acrylic acid ester oligomer), NOF Corp.'s Blemmer PP series (polypropylene glycol methacrylate), Blemmer PE series (polyethylene glycol monomethacrylate), Blemmer PEP series (polyethylene glycol polypropylene glycol methacrylate), Blemmer AP-400 (polypropylene glycol monoacrylate), Blemmer AE-350 (polyethylene glycol monoacrylate), Blemmer NKH-5050 (polypropylene glycol polytrimethylene monoacrylate) and Blemmer GLM (glycerol monomethacrylate), and ε-caprolactone-modified hydroxyalkyl vinyl copolymer compounds obtained by reacting hydroxy group-containing vinyl compounds with ε-caprolactone.

These hydroxy group-containing vinyl monomers maybe used singly or two or more of them may be used in admixture.

When said (x) component is a hydroxy group-containing one, the hydroxy group-containing vinyl monomer is preferably used in an amount of 2 to 50% by weight, more preferably 5 to 40% by weight, relative to the total amount of the components to be copolymerized. When the amount of such monomer is in excess of 50% by weight, the water resistance and acid resistance of the coatings formed by using the curable composition shows a tendency toward decrease.

The hydroxy equivalent of said resin (x) component is preferably 500 to 7,000 g/mole, more preferably 600 to 5,000 g/mole, still more preferably 700 to 3,000 g/mole. When such hydroxy equivalent is in excess of 7,000 g/mole, the heat curability of the composition tends to be poor.

Said (x) component may further contain a carboxyl group or groups. The carboxyl group-containing (x) component can be prepared, for example, from units derived from a carboxyl group-containing polymerizable vinyl compound and from an epoxy group-containing vinyl monomer and a unit derived from some other copolymerizable vinyl monomer, among others, by solution polymerization using a radical initiator, for instance. Said (x) component may also comprise a unit derived from the above-mentioned hydroxy group-containing vinyl monomer.

Said (y) component is a carboxyl group-containing compound. As said (y) component, there may be mentioned a carboxyl group-containing vinyl copolymer (y)-i component. Said carboxyl group-containing vinyl copolymer has at least two carboxyl groups per molecule. The carboxyl group-containing vinyl copolymer (y)-i component can be prepared, for example, by solution polymerization of a carboxyl group-containing polymerizable vinyl compound with the above-mentioned other copolymerizable vinyl monomer using a radical initiator.

Alternatively, said (y) component can be prepared by subjecting acid anhydride groups in the copolymer which is obtained by radical-polymerizing an acid anhydride group-containing radically polymerizable monomer and the above-mentioned other copolymerizable vinyl monomer to half esterification.

As the carboxyl group-containing polymerizable vinyl compound, there may specifically be mentioned half esters of α, β-ethylenically unsaturated carboxylic acids, such as acrylic acid, methacrylic acid, itaconic acid and maleic acid, or acid anhydrides thereof with a straight or branched alcohol containing 1 to 20 carbon atoms. As the acid anhydride group-containing radically polymerizable monomer, there may be mentioned itaconic anhydride, maleic anhydride and citraconic anhydride, among others.

The above-mentioned carboxyl group-containing polymerizable vinyl compound and acid anhydride group-containing radically polymerizable monomer preferably amount to 10 to 50% by weight, more preferably 15 to 40% by weight, on the basis of all the monomers.

The half esterification agent to be used for said half esterification is a low-molecular-weight alcohol and, there may specifically be mentioned methanol, ethanol, n-propanol, isopropanol, n-butanol, isobutanol, tert-butanol, methyl cellosolve, ethyl cellosolve, dimethylaminoethanol, acetol, allyl alcohol, propargyl alcohol, and the like. Particularly preferred compounds are acetol, allyl alcohol, propargyl alcohol, ethanol and methanol.

The half esterification reaction is carried out in the conventional manner at a temperature within the range of room temperature to 120° C. in the presence of a catalyst. As said catalyst, there may be mentioned tertiary amines (e.g. triethylamine, tributylamine), quaternary ammonium salts (e.g. benzyltrimethylammonium chloride, benzyltrimethylammonium bromide, benzyltributylammonium chloride, benzyltributyl-ammonium bromide).

Furthermore, the (y) component preferably has at least two carboxyl groups per molecule.

The epoxy group-containing (y)-i component can be obtained, for instance, by subjecting the above-mentioned epoxy group-containing vinyl monomer to copolymerization in the step of (y)-i component preparation using the method mentioned above.

From the viewpoint of curability, weather resistance, coat finish, etc., it is preferred that such epoxy group-containing (y)-i resin component have an epoxy equivalent of 200 to 2,000 g/mole, more preferably 230 to 1,000 g/mole, still more preferably 250 to 750 g/mole.

Further, when at least two epoxy groups occur in each molecule, satisfactory curability can be obtained.

Said (y)-i component may also contain a hydroxy group or groups. Such hydroxy group-containing (y)-i component can be obtained by subjecting such a hydroxy group-containing vinyl monomer as mentioned above to copolymerization in the step of (y)-i component preparation by the method mentioned above.

In cases where the (y)-i component is a hydroxy group-containing one, it is preferred that such resin have a hydroxy equivalent of 500 to 7,000 g/mole, more preferably 600 to 5,000 g/mole, still more preferably 700 to 3,000 g/mole. When such hydroxy equivalent is in excess of 7,000 g/mole, the composition shows a tendency toward decreased heat curability.

The carboxyl group-containing resin (y)-i component preferably has a number average molecular weight of 1,000 to 20,000, more preferably 2,000 to 10,000. A molecular weight lower than 1,000 will lead to unsatisfactory mechanical properties, among others. A molecular weight exceeding 20,000 will lead to an increased viscosity, with the result that the solid matter concentration should be decreased in the step of coating. It is also preferred that at least two carboxyl groups occur in each molecule. When there is only one carboxyl group, insufficient curability is obtained as the case may be.

As the (y) component, mention may also be made of a carboxyl group-containing oligomer compound (y)-ii component. Said carboxyl group-containing oligomer compound is a compound having at least two carboxyl groups per molecule and, while glutamic acid and a like compound can be used, it is preferably a compound obtained by subjecting a polyol compound having at least two, preferably two to ten, hydroxy groups per molecule and an acid anhydride compound to half esterification and containing at least two carboxyl groups per molecule (such compound is hereinafter referred to as carboxylic acid oligomer) when the weather resistance, acid resistance, recoatability or adhesion, among others, of the coatings obtained from the composition of the present invention are taken into consideration.

Said polyol compound containing at least two hydroxy groups per molecule to be used for synthesizing said carboxylic acid oligomer includes, among others, polyhydric alcohols such as ethylene glycol, 1,2- and 1,3-propylene glycol, 1,3-butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,3-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, trishydroxyethyl isocyanurate, dipentaerythritol and trishydroxymethylethane; ring opening adducts derived from such a polyhydric alcohol and a lactone compound, such as γ-butyrolactone or ε-caprolactone; adducts derived from said polyhydric alcohol and an isocyanate compound, such as tolylene diisocyanate, diphenylmethanediisocyanate, hexamethylene diisocyanate or isophoronediisocyanate, under an excess of such a polyhydric alcohol; adducts derived from said polyhydric alcohol and a vinyl ether compound, such as ethylene glycol divinyl ether, polyethylene glycol divinyl ether, butanediol divinyl ether, pentanediol divinyl ether, hexanediol divinyl ether or 1,4-cyclohexanedimethanol divinyl ether under an excess of such a polyhydric alcohol; and condensates derived from said polyhydric alcohol and alkoxysilicone compound such as KR-213, KR-217 or KR-9218 (each being a trademark; produced by Shin-Etsu Chemical) under an excess of such a polyhydric alcohol.

Preferred as the acid anhydride compound to be reacted with the above polyol compounds are hexahydrophthalic anhydride, phthalic anhydride, methylhexahydrophthalic anhydride, tetrahydrophthalic anhydride and trimellitic anhydride, among others.

Hydroxy group-containing carboxylic acid oligomers can also be prepared by adjusting the ratio between the polyol compound and the acid anhydride compound to be reacted therewith.

The carboxylic acid oligomer, which serves as the component (y)-ii, has amolecular weight of not more than 2,000. A molecular weight exceeding 2,000 may possibly lead to a problem, namely reductions in curability and compatibility. A preferred range of the molecular weight is 100 to 1,800.

As regards the proportion between the (x) component and (y) component, the (y) component, when it is a (y)-i component, is preferably used in an amount of 25 to 200 parts by weight, more preferably 50 to 150 parts by weight, per 100 parts by weight of the (x) component.

When the amount of the (y)-i component is in excess of 200 parts by weight, unreacted carboxyl groups remain, unfavorably leading to a reduction in chemical resistance. When it is less than 25 parts by weight, unfavorably, sufficient curing cannot be attained, hence the water resistance and weather resistance, among others, of the cured coatings are reduced. In cases where the (y)-ii component is used as the (y) component, the amount of the (y)-ii component to be used is preferably 0.1 to 100 parts by weight, more preferably 1 to 90 parts by weight, and still more preferably 1 to 80 parts by weight, per 100 parts by weight of the (x) component When said amount of (y)-ii component is in excess of 100 parts by weight, the water resistance and weather resistance may lower in certain instances. When it is less than 0.1 part by weight, the problem that the curability decreases tends to arise.

The (z) component mentioned above is an epoxy group- and carboxyl group-containing vinyl copolymer.

The number average molecular weight of said (z) component is preferably within the range of 2,000 to 20,000, more preferably within the range of 3,000 to 10,000, although it is only required that said molecular weight be not less than 1,000. A number average molecular weight less than 1,000 will lead to poor mechanical properties and water resistance, among others, while a molecular weight exceeding 20,000 will lead to an increased viscosity, with the result that the solid matter concentration should be decreased in the step of coating. From the viewpoint of curability, weather resistance, etc., the epoxy equivalent is preferably 200 to 2,000 g/mole, more preferably 400 to 1,500 g/mole.

The number of carboxyl groups to be introduced into said (z) component is at least one per molecule. Absence of the carboxyl group results in insufficient curability.

Where at least two carboxyl groups occur in each molecule, satisfactory curability can be obtained.

Said (z) component can be prepared, for example, by subjecting the above-mentioned carboxyl group-containing polymerizable vinyl compound and the above-mentioned epoxy group-containing vinyl monomer, together with the other copolymerizable vinyl monomer, to solution polymerization using a radical initiator.

The mole ratio between the epoxy group and carboxyl group in the component (A) is preferably such that the number of moles of epoxy groups per 1 mole of the carboxyl group (hereinafter referred to as "epoxy groups/carboxyl group") is 0.2 to 5.0, more preferably 0.5 to 4.0, still more preferably 0.6 to 3.0, since, then, curing compositions capable of showing or providing good curability, acid resistance, weather resistance and water resistance, among others, can be obtained.

The component (B) is now described.

The component (B) to be used in accordance with the present invention is a vinyl copolymer the main chain of which substantially consists of a vinyl copolymer chain and which has, within the molecule thereof, at least one hydrolyzable silyl group bound to a carbon atom as represented by the general formula (I) given hereinabove at a main chain terminus and/or on a side chain. In the present specification, the concept "hydrolyzable silyl group" includes a silanol group as well.

Since the main chain of said vinyl copolymer substantially consists of a vinyl copolymer chain, the coatings formed from the curable composition of the present invention can have good weather resistance and chemical resistance, among others. Further, since the hydrolyzable silyl group is bound to a carbon atom, the coatings are excellent in water resistance, alkali resistance and acid resistance as well.

While it is a requisite that, in the component (B), at least one hydrolyzable silyl group represented by the above general formula (I) should occur within the molecule, the presence of 2 to 10 such silyl groups is preferred since, then, the coatings formed from the resulting curable composition for coatings can have good solvent resistance.

In the above general formula (I), $R^1$ is a hydrogen atom or an alkyl group containing 1 to 10 carbon atoms, preferably an alkyl group containing 1 to 4 carbon atoms, such as methyl, ethyl, n-propyl, isopropyl, n-butyl, isobutyl or tert-butyl. When $R^1$ is an alkyl group containing more than 10 carbon atoms, the reactivity of the hydrolyzable silyl group tends to decrease. It is unfavorable, too, that $R^1$ is a group other than an alkyl group, for example a phenyl or benzyl group, since it results in a decrease in the reactivity of the hydrolyzable silyl group.

In the above general formula (I), $R^2$ is a hydrogen atom or a monovalent hydrocarbon group selected from among an alkyl group containing 1 to 10 carbon atoms, preferably an alkyl group containing 1 to 4 carbon atoms, such as mentioned above in relation to $R^1$, an aryl group containing 6 to 10 carbon atoms, such as phenyl group, and an aralkyl group containing 7 to 10 carbon atoms, such as benzyl group. Among these, an alkyl group is preferred in view of the good curability of the composition of the present invention.

The above vinyl copolymer can be produced, for example, by polymerizing comonomer components comprising the following (1) and (2), among others:

(1) Hydrolyzable silyl group-containing vinyl monomer (monomer (y-1));

(2) Other copolymerizable monomer (monomer (y-2)).

As said monomer (y-1), there may be mentioned the following:

compounds represented by the general formula (II):

wherein $R^1$, $R^2$ and a are as defined above and $R^7$ represents a hydrogen atom or a methyl group, such as

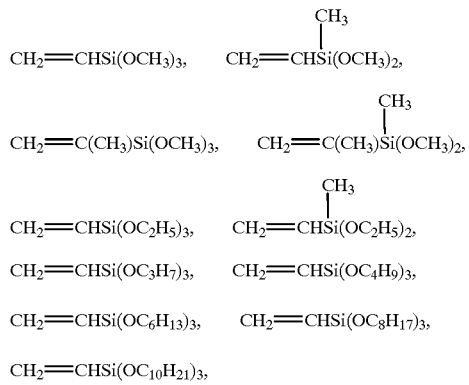

compounds represented by the general formula (III);

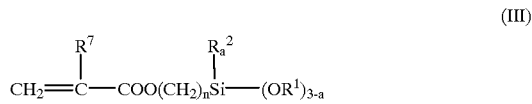

wherein $R^1$, $R^2$, $R^7$ and a are as defined above and n represents an integer of 1 to 12, such as

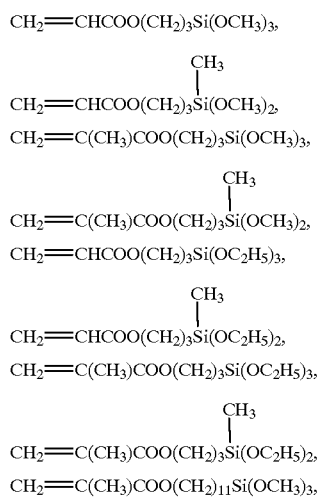

compounds represented by the general formula (IV):

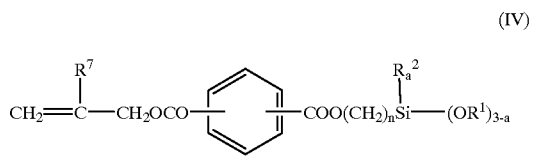

wherein $R^1$, $R^2$, $R^7$, a and n are as defined above, such as $CH_2\!\!=\!\!CH\!\!-\!\!CH_2OCO(o\text{-}C_6H_4)COO(CH_2)_3Si(OCH_3)_3,$ $CH_2\!\!=\!\!CH\!\!-\!\!CH_2OCO(o\text{-}C_6H_4)COO(CH_2)_3\overset{\underset{\displaystyle CH_3}{|}}{Si}(OCH_3)_2$ compounds represented by the general formula (V):

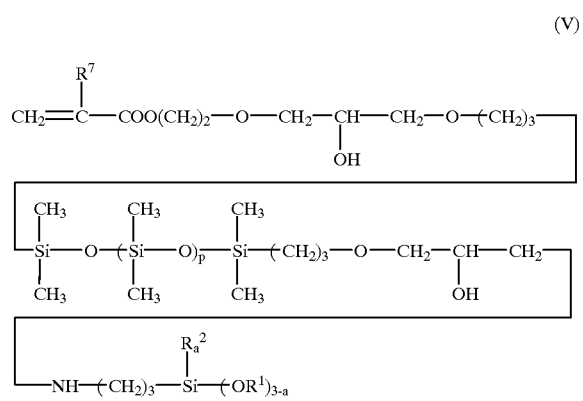

wherein $R^1$, $R^2$, $R^7$ and a are as defined above and p represents an integer of 0 to 22, such as

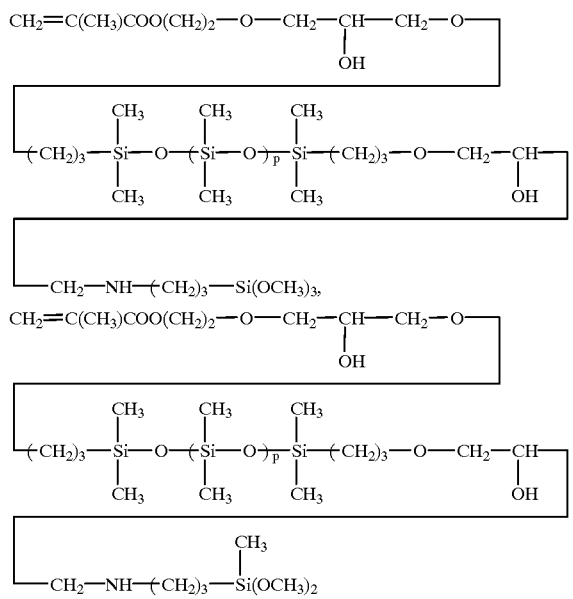

[wherein p represents an integer of 0 to 20];
and (meth)acrylates terminally having the hydrolyzable silyl group of the above general formula (II) via urethane bonding or siloxane bonding. These may be used singly or two or more of them may be used in combination. Among those mentioned above, compounds represented by the above general formula (IV) are preferred since they are easy to handle, are inexpensive and do not cause byproduct formation.

The monomer (y-1) is preferably used in an amount of 5 to 60% by weight, more preferably 10 to 50% by weight, based on the total amount of all the comonomer components. When such monomer (y-1) is used in an amount smaller than 5% by weight, the coatings formed from the resulting curable composition tend to show insufficient acid resistance. When it is used in an amount exceeding 60% by weight, the storage stability of the curable composition tends to decrease.

As said monomer (y-2), there may be mentioned, among others, (meth)acrylic acid derivatives such as methyl (meth) acrylate, ethyl (meth)acrylate, n-butyl (meth)acrylate, isobutyl (meth)acrylate, 2-ethylhexyl (meth)acrylate, stearyl (meth)acrylate, benzyl (meth)acrylate, cyclohexyl (meth) acrylate, trifluoroethyl (meth)acrylate, pentafluoropropyl (meth)acrylate, perfluorocyclohexyl (meth)acrylate, (meth) acrylonitrile, glycidyl (meth)acrylate, dimethylaminoethyl (meth)acrylate, diethylaminoethyl (meth)acrylate, (meth) acrylamide, α-ethyl(meth)acrylamide, N-methyl(meth) acrylamide, N,N-dimethyl(meth)acrylamide, N-butoxymethyl(meth)acrylamide, macromonomers which are compounds such as AS-6, AN-6, AA-6, AB-6, AK-5, etc. (products of TOAGOSEI), phosphate ester group-containing vinyl compounds such as condensation products from an α, β-ethylenically unsaturated carboxylic acid hydroxyalkyl ester (e.g. a hydroxyalkyl (meth)acrylate) and phosphoric acid or a phosphoric acid ester, and urethane or siloxane bond-containing (meth)acrylates; aromatic hydrocarbon vinyl compounds such as styrene, α-methylstyrene, chlorostyrene, styrenesulfonic acid, 4-hydroxystyrene and vinyltoluene; unsaturated carboxylic acids such as maleic acid, fumaric acid and itaconic acid, and salts thereof such as alkali metal salts, ammonium salt and amine salts; unsaturated carboxylic acid anhydrides such as maleic anhydride, and unsaturated carboxylic acid esters derived therefrom such as diesters or half esters with a straight or branched alcohol containing 1 to 20 carbon atoms; vinyl esters and allyl compounds such as vinyl acetate, vinyl propionate and diallyl phthalate; amino group-containing vinyl compounds such as vinylpyridine and aminoethyl vinyl ether; amide group-containing vinyl compounds such as itaconic acid diamide, crotonamide, maleic acid diamide, fumaric acid diamide and N-vinylpyrrolidone; and other vinyl compounds such as methyl vinyl ether, cyclohexyl vinyl ether, vinyl chloride, vinylidene chloride, chloroprene, propylene, butadiene, isoprene, fluoroolefin maleimide, N-vinylimidazole and vinylsulfonic acid. These may be used singly or two or more of them may be used in combination.

The hydrolyzable silyl group equivalent in the component (B) is preferably 500 to 7,000 g/mole, more preferably 550 to 5,000 g/mole, still more preferably 650 to 4,000 g/mole, since, then, curable compositions capable of showing or providing good heat curability, acid resistance and weather resistance, among others, can be obtained. When such hydrolyzable silyl group equivalent is less than 500 g/mole, the internal stress increases When it is in excess of 7,000 g/mole, the curability tends to decrease.

The above component (B) may have a hydroxy group or groups as well.

The method of introducing said hydroxy groups comprises, for example, copolymerizing a hydroxy group-containing vinyl monomer (monomer (y-3)).

Said monomer (y-3) includes, among others, 2-hydroxyethyl (meth)acrylate, 1-hydroxypropyl (meth)acrylate, 2-hydroxypropyl (meth)acrylate, 2-hydroxyethyl vinyl ether, N-methylol(meth)acrylamide, Aronix 5700 (product of TOAGOSEI), 4-hydroxystyrene, hydroxy group-terminated acrylic acid ester oligomers, such as HE-10, HE-20, HP-1 and HP-20 (products of NIPPON SHOKUBAI), Blemmer PP series (polypropylene glycol methacrylate), Blemmer PE series (polyethylene glycol monomethacrylate), Blemmer PEP series (polyethylene glycol polypropylene glycol methacrylate), Blemmer AP-400 (polypropylene glycol monoacrylate), Blemmer AE-350 (polyethylene glycol monoacrylate), Blemmer NKH-5050 (polypropylene glycol polytrimethylene monoacrylate) and Blemmer GLM (glycerol monomethacrylate) (products of NOF Corp.) and the like, and ε-caprolactone-modified hydroxyalkyl vinyl copolymer compounds obtained by reacting hydroxy group-containing vinyl compounds with ε-caprolactone.

As typical examples of said ε-caprolactone-modified hydroxyalkyl vinyl copolymerizable compounds, there may be mentioned, among others, compounds represented by the general formula (VI):

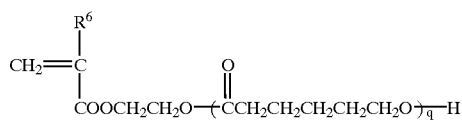

(VI)

Specific examples are Placcel FA-1 ($R^6$=hydrogen atom, q=1), Placcel FA-4 ($R^6$=hydrogen atom, q=4), Placcel FM-1 ($R^6$=hydrogen atom, q=1) and Placcel FM-4 ($R^6$=hydrogen atom, q=4) (each being a product of DAICEL CHEMICAL INDUSTRIES), and TONE M-100 ($R^6$=hydrogen atom, q=2) and TONE M-201 ($R^6$=methyl group, q=1) (both being products of UCC), among others.

These monomers (y-3) may be used singly or two or more of them may be used combinedly.

Preferred among said monomers (y-3) are 2-hydroxypropyl (meth)acrylate, 2-hydroxyethyl (meth)acrylate and ε-caprolactone-modified hydroxyalkyl vinyl copolymerizable compounds, since when these are used, the coatings formed from the resulting curable composition show good acid resistance and water resistance. 2-Hydroxypropyl (meth)acrylate is particularly preferred.

When the component (B) is a hydroxy group-containing one, the above monomer (y-3) is preferably used in an amount of 2 to 50% by weight, more preferably 2 to 35% by weight, based on the total amount of all the comonomer components. When such monomer (y-3) is used in an amount in excess of 50% by weight, the water resistance and acid resistance of the coatings formed from the resulting curable composition tend to decrease.

Further, when the component (B) is a hydroxy group-containing one, the hydroxy equivalent (number of grams of the vinyl copolymer containing 1 mole of the hydroxy groups) of said component (B) is preferably 500 to 7,000 g/mole. When such hydroxy equivalent is in excess of 7,000 g/mole, the composition tends to have poor heat curability.

Said component (B) may have an epoxy group or groups as well.

The epoxy group introduction may be effected by subjecting the above-mentioned epoxy group-containing vinyl monomer to copolymerization. Said epoxy group-containing vinyl monomer is preferably used in an amount of 5 to 50% by weight, more preferably 7 to 40% by weight, based on the total amount of all the comonomer components. When such monomer is used in an amount less than 5% by weight, the resulting composition tends to show insufficient curability or provide only insufficient acid resistance. When it is used in an amount in excess of 50% by weight, the water resistance and compatibility with other resins tend to decrease.

When the component (B) is an epoxy group-containing one, the epoxy equivalent thereof is preferably 200 to 2,000 g/mole, more preferably 230 to 1,000 g/mole, still more preferably 250 to 750 g/mole, in view of the attainable curability, weather resistance and coat finish, among others.

In the practice of the present invention, a segment formed by urethane bonding or siloxane bonding may be included in the vinyl copolymer main chain in an amount not exceeding 50% by weight of the vinyl copolymer for the purpose of improving the weather resistance, solvent resistance and impact resistance, among others, of the coatings formed from the resulting curable composition.

The vinyl copolymer to be used in the practice of the present invention can be produced from a copolymer component containing the above-mentionedmonomers (y-1), (y-2), (y-3) and the like by the methods described in JP Kokai S54-36395 and JP Kokai S57-55954, among others. Because of ease of synthesis and for other reasons, it is preferable to produce it by solution polymerization using an azo radical polymerization initiator such as azobisisobutyronitrile.

Any nonreactive solvent may be used as the polymerization solvent in the above solution polymerization without any particular limitation and, for example, mention may be made of hydrocarbons such as toluene, xylene, n-hexane and cyclohexane; acetate esters such as ethyl acetate and butyl acetate; alcohols such as methanol, ethanol, isopropanol and n-butanol; ethers such as ethyl cellosolve, butyl cellosolve and cellosolve acetate; and ketones such as methyl ethyl ketone, ethyl acetoacetate, acetylacetone, diacetone alcohol, methyl isobutyl ketone and acetone.

The above polymerization solvents may be used singly or two or more of them may be used in combination. Since, however, when an alcohol, such as methanol or butanol is used in an amount of less than 0.01 part by weight per 100 parts by weight of the comonomer components, gelation may possibly occur during polymerization, it is recommended that the alcohol be contained in an amount of 0.01 to 30 parts by weight per 100 parts by weight of the comonomer components.

The molecular weight of the vinyl copolymer to be obtained may be adjusted by using a chain transfer agent in the step of the above solution polymerization.

As specific examples of said chain transfer agent, there may be mention, among others, n-dodecyl mercaptan, tert-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si$-S-S-Si$(OCH_3)_3$ and $(CH_3O)_3Si$-$S_8$-Si$(OCH_3)_3$. These may be used singly or two or more of them may be used in combination.

The use of a chain transfer agent having a hydrolyzable silyl group within the molecule thereof, such as the above-mentioned γ-mercaptopropyltrimethoxysilane, is preferred since the hydrolyzable silyl group can be introduced into the vinyl copolymer at a main chain terminus. The chain transfer agent is preferably used in an amount of 0.1 to 10% by weight based on the total amount of all the copolymerizable components.

The above component (B) is preferably used in an amount of 1 to 200 parts by weight per 100 parts by weight of the above component (A). When the component (B) amounts to less than 1 part by weight, the effect of improving the appearance tends to be insufficient.

When its amount exceeds 200 parts by weight, the storage stability tends to decrease. The amount of the component (B) to be used is more preferably 1 to 150 parts by weight, still more preferably 1 to 100 parts by weight, most preferably 1 to 50 parts by weight, per 100 parts by weight of the component (A).

The component (C) is now described.

The silicon compound represented by the following general formula (VII):

$$(R^3O)_{4-b}SiR^4_b \qquad (VII)$$

and/or a partial hydrolyzate condensate thereof, which is the component (C) to be employed in accordance with the present invention, serves as a component for improving the stain resistance of the coatings formed from the resulting curable composition.

In the above general formula (VII), $R^3$ represents a hydrogen atom or a monovalent hydrocarbon group selected from among an alkyl group containing 1 to 10 carbon atoms, preferably an alkyl group containing 1 to 4 carbon atoms, an aryl group, preferably an aryl group containing 6 to 10 carbon atoms, and an aralkyl group, preferably an aralkyl group containing 7 to 10 carbon atoms. $R^4$ represents a monovalent hydrocarbon group selected from among an alkyl group containing 1 to 10 carbon atoms, preferably an alkyl group containing 1 to 4 carbon atoms, an aryl group, preferably an aryl group containing 6 to 10 carbon atoms, and an aralkyl group, preferably an aralkyl group containing 7 to 10 carbon atoms. Since a is an integer of 0 to 2, two to four ($R^3O$) groups are present in each molecule. It is not always necessary, however, that the plurality of $R^3$ groups in these ($R^3O$) groups is identical. As regards $R^4$ as well, the $R^4$ groups, when present in plurality, are not required to be identical.

As specific examples of the above silicon compound, there may be mentioned, among others, tetraalkyl silicates such as tetramethyl silicate, tetraethyl silicate, tetra-n-propyl silicate, tetraisopropyl silicate, tetra-n-butyl silicate, tetraisobutyl silicate and tetra-tert-butyl silicate; trialkoxysilanes and triaryloxysilanes, for example alkyltrialkoxysilanes such as methyltrimethoxysilane, methyltriethoxysilane, octadecyltriethoxysilane, methyl-sec-octyloxysilane, methyltriisopropoxysilane and methyltributoxysilane, aryltrialkoxysilanes such as phenyltrimethoxysilane and phenyltriethoxysilane, alkyltriaryloxysilanes such as methyltriphenoxysilane, glycidoxytrialkoxysilanes such as 3-glycidoxypropyltrimethoxysilane; and the like.

As the partial hydrolyzate condensate of the above silicon compound, there may be mentioned the products obtained by adding the above tetraalkyl silicates, trialkoxysilanes or triaryloxysilanes, for instance, to water in the conventional manner to cause partial hydrolysis and condensation, and the products derived from the above tetraalkyl silicates by hydrolysis in an alcohol solvent in the presence of an acidic substance and water. As specific examples thereof, there may be mentioned, among others, tetraalkyl silicate partial hydrolyzate condensates such as MSI51, ESI40, HAS-1 and HAS-10 (products of Colcoat), and MS51, MS56 and MS56S (products of Mitsubishi chemical).

Such components (C) as mentioned above may be used singly or two or more of them may be used in combination. In view of the compatibility between component (A) and component (B), the curability of the resulting composition and preventing the stain substance establishing because of the high hardness of the coatings formed from said composition, the tetraalkyl silicates, such as ESI28, and/or partial hydrolyzate condensates of tetraalkyl silicates, such as MS51, MS56, MS56S and HAS-1, are preferred.

The component (C) is preferably admixed in an amount of 1 to 100 parts by weight, more preferably 1 to 80 parts by weight, still more preferably 5 to 80 parts by weight, per 100 parts by weight of the component (A). When the amount of the component (C) is less than 1 part by weight, the antistaining effect is insufficient while, in an amount exceeding 100 parts by weight, the impact resistance lowers.

The curable composition for coatings of the present invention preferably comprises 100 parts by weight of the component (A), 1 to 100 parts by weight of the component (B) and 1 to 100 parts by weight of the component (C). The curable composition for coatings can gain a good balance of, among others, a stain resistance and a finish appearance because of the mixed ratio.

As mentioned hereinabove, WO 98/07797 discloses a curable composition ($\alpha$) for coatings which comprises an epoxy group-containing resin (A) component, a carboxyl group-containing compound (B) component and a silicate (C) component as well as a composition derived from said composition by introducing a hydrolyzable silyl group into the (A) component, namely a curable composition ($\beta$) for coatings which comprises a hydrolyzable silyl group- and epoxy group-containing resin (A) component, a carboxyl group-containing compound (B) component and a silicate (C) component. On the contrary, the curable composition for coatings of the present invention comprises an acid group- and epoxy group-containing component (A), a hydrolyzable silyl group bound to a carbon atom -containing component (B), and a silicate compound component (C). Thus, as compared with the known coating compositions mentioned above, the curable composition for coatings of the present invention differs from the curable composition ($\alpha$) for coatings in comprising a hydrolyzable silyl group-containing polymer and from the curable composition ($\beta$) for coatings in comprising the hydrolyzable silyl group-containing polymer and epoxy group-containing compound as different components.

For refining the coated article in appearance, a leveling agent is generally added to coating compositions so that the finish appearance may be improved. On the other hand, the curable composition for coatings of the present invention comprises a hydrolyzable silyl group-containing polymer, so that it can provide a good appearance and a satisfactory finish appearance without adding any leveling agent. It is of course possible, however, to submit the curable composition for coatings of the present invention to coating with addition of a leveling agent.

The curable composition for coatings of the present invention has good storage stability because of the fact that it contains the hydrolyzable silyl group-containing polymer and epoxy group-containing compound as separate components, namely that at least part of the epoxy groups exist in a compound different from the hydrolyzable silyl group-containing polymer.

The component (D) is now described.

In the curable composition of the present invention, a curing catalyst component (D) is appropriately used.

Any compound useful as a curing catalyst for hydrolyzable silyl group-containing compounds or any compound used for the esterification reaction between an acid and epoxy can be used as the curing catalyst component (D), without any particular limitation.

As specific examples of the curing catalyst component (D), there may be mentioned, among others, organotin compounds such as dibutyltin dilaurate, dibutyltin dimaleate, dioctyltin dilaurate, dioctyltin dimaleate and stannous octoate; phosphoric acid or phosphate esters such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate; addition reaction products from phosphoric acid and/or phosphoric acid monoester and an epoxy compound such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyl-dimethoxysilane, Yuka Shell Epoxy's Cardura E, Yuka Shell Epoxy's Epikote 828 or Epikote 1001; organic titanate compounds; organoaluminum compounds; organozinc compounds; carboxylic acid compounds (organic carboxylic acid compounds) such as maleic acid, adipic acid, azelaic acid, sebacic acid, itaconic acid, citric acid, succinic acid, phthalic acid, trimellitic acid andpyromellitic acid, and anhydrides thereof; sulfonic acid compounds (organic sulfonic acid compounds) such as dodecylbenzenesulfonic acid, paratoluenesulfonic acid, 1-naphthalenesulfonic acid and 2-naphthalenesulfonic acid, and blocked sulfonic acid compounds (acid-amine reaction products) derived from the above sulfonic acid compounds by blocking with a nitrogen-containing compound (e.g. 1-amino-2-propanol, monoethanolamine, diethanolamine, 2-(methylamino)ethanol, 2-dimethylethanolamine, 2-amino-2-methyl-1-propanol, diisopropanolamine, 3-aminopropanol, 2-methylamino-2-methylpropanol, morpholine, oxazolidine, 4,4-dimethyloxazolidine, 3,4,4-trimethyloxazolidine), (for example KING INDUSTRIES' NACURE 5225, NACURE 5543 and NACURE 5925); amines such as hexylamine, di-2-ethylhexylamine, N,N-dimethyldodecylamine, dodecylamine, DABCO, DBU, morpholine and diisopropanolamine; reaction products from these amines and acidic phosphate esters; alkaline compounds such as sodium hydroxide and potassium hydroxide, quaternary ammonium salts such as benzyltriethylammonium chloride or bromide, tetrabutylammonium chloride or bromide, and phosphonium salts. These curing catalysts may be used singly or two or more of them may be used in combination.

The curing catalyst component (D) is preferably used in an amount of 0.001 to 10 parts by weight per 100 parts by weight of the total solid matter of the components (A), (B) and (C).

Further, other ingredients which may be used in the curable composition of the present invention are described.

A solvent is adequately used in the curable composition of the present invention. The species thereof is not particularly restricted but may be any solvent capable of dissolving or stably dispersing all the components (A), (B) and (C). As typical examples, there may be mentioned hydrocarbons such as toluene, xylene, cyclohexane, n-hexane and octane, alcohols such as methanol, ethanol, isopropanol, n-butanol, isobutanol, sec-butanol, tert-butanol, ethylene glycol monoalkyl ethers, esters such as methyl acetate and butyl acetate, and ketones such as acetone, methyl ethyl ketone, methyl isobutyl ketone and cyclohexanone. The solvent used in synthesizingthe component (A) or (B) may be used as said solvent just as it is.

The weather resistance of the curable composition for coatings of the present invention can further be improved by incorporating a weather resistance improving agent such as an ultraviolet absorber or a light stabilizer.

Said ultraviolet absorber includes, among others, benzophenones, triazoles, phenyl salicylates, diphenylacrylates, and acetophenones. These may be used singly or two or more of them may be used in combination.

Said light stabilizer includes, among others, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate. These may be used singly or two or more of them may be used in combination.

Said ultraviolet absorber is generally used in an amount of 0.1 to 10 parts by weight, preferably 1 to 5 parts by weight, per 100 parts of the resin solids in the curable composition.

Said light stabilizer is generally used in an amount of 0.1 to 10 parts by weight, preferably 1 to 5 parts by weight, per 100 parts of the resin solids in the curable composition.

The curable composition for coatings of the present invention can be produced by adequately mixing up the above acid group- and epoxy group-containing component (A), the above hydrolyzable silyl group bound to a carbon atom -containing component (B) and the above component (C) consisting of a silicate compound, and the method of production thereof is not particularly restricted. It is preferable, however, to employ the method comprising separately packing the above acid group- and epoxy group-containing component (A) as a composition for coatings, and the above component (B) having a hydrolyzable silyl group bound to a carbon atom and the above component (C) comprising a silicate compound as a resin composition for coatings, for mixing together prior to use.

The composition for coatings comprising the component (A) and the resin composition for coatings comprising the component (B) and the component (C) are mixed together. Since the obtained curable composition for coatings contains the hydrolyzable silyl group-containing polymer as one component and the epoxy group-containing compound as the other component, it shows a improved finish appearance such as luster and clarity or sharpness and a improved storage stability compared with a conventional composition for coatings. Accordingly, the curable composition for coatings of the present invention can provide a satisfactory appearance without further adding a leveling agent.

A resin composition for coatings which is intended for producing the curable composition for coatings of the invention by mixing with the above composition for coatings which comprises the acid group- and epoxy group-containing component (A) and which resin composition consisting of the above component (B) having a hydrolyzable silyl group bound to a carbon atom and the above component (C) consisting of a silicate compound also falls under an aspect of the present invention.

By adding the resin composition for coatings which comprises the above components (B) and (C), in the step of preparing a curable composition for coatings using the composition for coatings which comprises the above component (A), it is possible to attain a satisfactory finish appearance without using any leveling agent. It is to be noted, however, that the spirit of the present invention does not exclude the use of a leveling agent.

The resin composition for coatings of the present invention preferably has a mixing ratio between the components (B) and (C) such that said component (B) amounts to 1 to 100 parts by weight and said component (C) amounts to 1 to 100 parts by weight per 100 parts by weight of said component (A) comprised the above-mentioned composition for coatings. The curable composition for coatings having a good balance of a stain resistance, a finish appearance and a storage stability can be obtained because of the mixed ratio.

In the following, an example of the coating process using the curable composition of the present invention is described.

First, a coating composition or paint containing a metallic powder and/or a color pigment is applied to an article or substrate to be coated and, then, a top coat clear coating composition or a paint comprising, as the main component thereof, the curable composition of the present invention is applied to the surface of the above coated article.

Said metallic powder- and/or color pigment-containing coating composition or paint (base coat) is not particularly restricted but includes, among others, those comprising, as the main component, an aminoalkyd resin, oil-free alkyd resin, thermosetting acrylic resin, thermosetting urethane resin, nitrocellulose lacquer, modified acrylic lacquer, straight acrylic lacquer, cold-setting urethane resin, acrylic enamel resin, oxidation-curable alkyd resin, oxidation-curable modified (e.g. CAB) alkyd resin, cold-setting or heat-curable fluorine resin, hydrolyzable silyl group-containing resin or the curable composition of the present invention, or a mixture of these, with a metallic powder and/or a color pigment incorporated therein.

Said metallic powder- and/or color pigment-containing coating composition or paint may be any one of the solution type with an organic solvent as the medium or the vehicle, or the nonaqueous dispersion type, multican type, powder type, slurry type or aqueous type, or the like.

The metallic powder and the color pigment are not particularly restricted but maybe any of the conventional ones. As specific examples of the metallic powder, there may be mentioned, among others, aluminum powder, copper powder and mica powder and, as specific examples of the color pigment, there may be mentioned, among others, organic pigments such as phthalocyanine blue, toluidine red, benzidine yellow, and inorganic pigments such as titanium oxide, carbon black and iron oxide red. These metallic powders and color pigments may be used singly or two or more of them may be used in combination.

The weather resistance of the coated article can further be improved by incorporating the above-mentioned ultraviolet absorber and/or light stabilizer in the base coat.

The above-mentioned silicon compound (e.g. aminosilane compound) may be incorporated in the metallic powder- and/or color pigment-containing coating composition to thereby improve the adhesion of the coat film thereof to the top coat clear film.

In that case, the silicon compound is generally used in an amount of not more than 20 parts by weight, preferably 0.5 to 10 parts by weight, per 100 parts by weight of the metallic powder- and/or color pigment-containing coating composition.

The coated article of the present invention has a base coat film and further thereon a top coat clear film and can be produced, for example, by the two-coat one-bake technique which comprises applying the above metallic powder- and/or color pigment-containing coating composition to the article to be coated and, after several minutes of setting, applying the top coat clear coating composition in the wet-on-wet manner, followed by curing by heating, or by the two-coat two-bake technique which comprises applying the metallic powder- and/or color pigment-containing coating composition, curing the coating by heating, then applying the top coat clear coating composition and curing the coating by heating.

The application of the top coat clear coating composition may be carried out by various conventional methods, for example by dipping, spraying, brushing or by using a roll coater or flow coater. Thereafter, the coating can be cured by heating at a temperature not lower than 30° C., preferably 55 to 350° C.

The coating thickness of the coat film on the coated article varies according to the field of application, hence cannot be generally specified. However, from the viewpoint for covering or hiding an article or substrate, among others, the coating thickness of the metallic powder- and/or color pigment-containing coating composition is preferably within the range of 10 to 30 μm and, from the viewpoint of durability, among others, the coating thickness of the top coat clear coating composition is preferably within the range of 20 to 50 μm.

The curable composition for coatings of the present invention can show or provide good acid resistance, scratch resistance, appearance characteristics, heat curability and stain resistance, among others, and can provide very good weather resistance and, therefore, can preferably be used in top coatings for automobiles, industrial equipment, steel furniture, building interior and exterior, household electric appliances, and plastics products, for instance. In particular, it is suited for use in top coatings for automobiles.

EXAMPLES

The following examples illustrate the curable composition for coatings of the present invention, and the coated article obtainable by applying said composition. It is to be noted that these examples are by no means limitative of the scope of the present invention.

Synthesis Example 1

[Synthesis of Epoxy Group-containing Resins ((x)-1, (x)-2), Epoxy Group- and Hydroxy Group-containing Resins ((x)-3, (x)-4) and a Carboxy-containing Vinyl Copolymer ((y)-1)]

A reactor equipped with stirrer, thermometer, reflux condenser, nitrogen inlet tube and dropping funnel was charged with the materials specified under "Part 2" in Table 1 and, while nitrogen gas was introduced, the temperature was raised to 105° C. and a mixed solution composed of the materials specified under "Part 1" was added dropwise at a constant rate over 5 hours.

Then, thereto was added dropwise a mixed solution composed of the materials specified under "Part 3" at a constant rate over 1 hour. Thereafter, the mixture was stirred at 105° C. for 2 hours and then cooled to room temperature.

The solid concentration of the obtained solution and the number average molecular weight (determined by gel permeation chromatography (GPC)), epoxy equivalent and alcoholic hydroxy equivalent of the copolymer were as shown in Table 1. The epoxy equivalent and alcoholic hydroxy equivalent were determined by calculation.

TABLE 1

| | | Synthesis Example | | | | |
|---|---|---|---|---|---|---|
| Part | Composition | (x)-1 | (x)-2 | (x)-3 | (x)-4 | (y)-1 |
| 1 | Styrene | 10 | 10 | 15 | 15 | 20 |
| | Cyclohexyl methacrylate | 10 | 20 | 10 | 15 | |
| | 2-Ethylhexyl acrylate | 30 | 30 | 30 | 15 | 30 |

TABLE 1-continued

| Part | Composition | (x)-1 | (x)-2 | (x)-3 | (x)-4 | (y)-1 |
|---|---|---|---|---|---|---|
| | Glycidyl methacrylate | 50 | 20 | 40 | 30 | |
| | Isobutyl methacrylate | | 20 | | 6 | 30 |
| | 2-Hydroxyethyl methacrylate | | | 5 | 19 | |
| | Acrylic acid | | | | | 20 |
| | Solvesso 100 | 10 | 10 | 10 | 10 | 10 |
| | 1 Butanol | 6 | 6 | 6 | 6 | 6 |
| | t-Butyl peroxy-2-ethylhexanoate | 5.7 | 4.7 | 5.7 | 5.7 | 5.7 |
| 2 | Solvesso 100 | 15 | 15 | 15 | 15 | 15 |
| | 1-Butanol | 10 | 10 | 10 | 10 | 10 |
| 3 | Xylene | 10 | 10 | 10 | 10 | 10 |
| | t-Butyl peroxy-2-ethylhexanoate | 0.3 | 0.3 | 0.3 | 0.3 | 0.3 |
| Solid concentration (%) | | 63 | 64 | 63 | 65 | 63 |
| Number average molecular weight | | 5900 | 6800 | 6000 | 6100 | 6000 |
| Alcoholic hydroxy equivalent | | | | 2600 | 684 | |
| Epoxy equivalent | | 284 | 710 | 355 | 473 | |

Synthesis Example 2
[Synthesis of a Carboxyl Group-containing Vinyl Copolymer ((y)'-2)]

A polymer ((y)'-2) was synthesized by following the procedure of Synthesis Example 1 and using the materials specified in Table 2.

The solid concentration of the obtained solution and the number average molecular weight (determined by GPC) of the polymer ((y)'-2) were as shown in Table 2.

A solution of 1.0 part by weight of triethylamine dissolved in 17.6 parts by weight of butyl acetate and 10 parts by weight of methanol were added to 192.3 parts by weight of the obtained polymer ((y)'-2), and the reaction was allowed to proceed at 60° C. for 8 hours, to give a polymer ((y)-2). Complete disappearance of the acid anhydride absorption (1,785 cm$^{-1}$) was confirmed by IR spectroscopy.

TABLE 2

| Part | Composition | Synthesis Example (y)'-2 |
|---|---|---|
| 1 | Styrene | 15 |
| | Cyclohexyl methacrylate | 20 |
| | 2-Ethylhexyl acrylate | 30 |
| | Isobutyl methacrylate | 14.5 |
| | Maleic anhydride | 20.5 |
| | Solvesso 100 | 20.5 |
| | Propylene glycol monomethyl ether acetate | 4.1 |
| | t-Butyl peroxy-2-ethylhexanoate | 5.7 |
| 2 | Solvesso 100 | 26 |
| 3 | Xylene | 10 |
| | t-Butyl peroxy-2-ethylhexanoate | 0.3 |
| Solid concentration (%) | | 52 |
| Number average molecular weight | | 6000 |

Synthesis Example 3
[Synthesis of Carboxyl Group-containing Oligomer Compounds ((y)-3, (y)-4)]

A reactor equipped with stirrer, thermometer, reflux condenser, nitrogen gas inlet tube and dropping funnel was charged with the materials specified under "Part 1" in Table 3 and, while nitrogen gas was introduced, the contents were stirred at 100° C. for 15 minutes and then the materials specified under "Part 2" were added over 15 minutes.

Thereafter, the reaction was allowed to proceed at 120° C. for 3 hours. Disappearance of the acid anhydride absorption (1,785 cm$^{-1}$) was confirmed by IR spectroscopy.

TABLE 3

| Part | Composition | (y)-3 | (y)-4 |
|---|---|---|---|
| 1 | Triethylamine | 0.07 | 0.07 |
| | Pentaerythritol | 35 | |
| | Trimethylolpropane | | 34 |
| | Propylene glycol monomethyl ether acetate | 110 | 76 |
| 2 | Methylhexahydrophthalic anhydride | 169 | |
| | Hexahydrophthalic anhydride | | 113 |
| Solid concentration (%) | | 65 | 66 |
| Number average molecular weight | | 809 | 597 |

Synthesis Example 4
[Synthesis of Epoxy Group- and Carboxyl Group-containing Vinyl Copolymer ((z)-1)]

A reactor equipped with stirrer, thermometer, reflux condenser, nitrogen gas inlet tube and dropping funnel was charged with the materials specified under "Part 2" in Table 4 and, while nitrogen gas was introduced, the temperature was raised to 80° C. and a mixed solution composed of the materials specified under "Part 1" was added dropwise at a constant rate over 3 hours.

Then, thereto was added dropwise a mixed solution composed of the materials specified under "Part 3" at a constant rate over 1 hour. Thereafter, the mixture was stirred at 80° C. for 2 hours and then cooled to room temperature.

The solid concentration of the obtained solution and the number average molecular weight (determined by gel permeation chromatography (GPC)), epoxy equivalent and mole ratio (epoxy groups/carboxyl group) were as shown in Table 4.

TABLE 4

| Part | Composition | Synthesis Example (z)-1 |
|---|---|---|
| 1 | Styrene | 20 |
| | Cyclohexyl methacrylate | 20 |
| | 2-Ethylhexyl acrylate | 32 |
| | Glycidyl methacrylate | 20 |
| | Acrylic acid | 6 |
| | Solvesso 100 | 24 |
| | 1-Butanol | 6 |
| | t-Butyl peroxy-2-ethylhexanoate | 4.8 |
| 2 | Solvesso 100 | 40 |
| | 1-Butanol | 10 |
| 3 | Xylene | 10 |
| | t-Butyl peroxy-2-ethylhexanoate | 0.2 |
| Solid concentration (%) | | 53 |
| Number average molecular weight | | 5500 |
| Epoxy equivalent | | 710 |
| Mole ratio (epoxy groups/carboxyl group) | | 1.69 |

Synthesis Example 5
[Synthesis of (B)-1, (B)-2, (B)-3 and (B)-4]

A reactor equipped with stirrer, thermometer, reflux condenser, nitrogen gas inlet tube and dropping funnel was charged with the materials specified under "Part 2" in Table 5 and, while nitrogen gas was introduced, the temperature was raised to 115° C. and a mixed solution composed of the materials specified under "Part 1" was added dropwise at a constant rate over 4 hours.

Then, thereto was added dropwise a mixed solution composed of the materials specified under "Part 3" at a constant rate over 1 hour. Thereafter, the mixture was stirred at 115° C. for 2 hours and then cooled to room temperature. Finally, a mixed solution composed of the materials specified under "Part 4" was added and the resulting mixture was stirred.

The solid concentration of the obtained solution and the number average molecular weight (determined by gel permeation chromatography (GPC)), hydrolyzable silyl group equivalent alcoholic hydroxy group equivalent and epoxy equivalent were as shown in Table 5.

TABLE 5

|      |                           | Synthesis Example |       |       |       |
|------|---------------------------|-------|-------|-------|-------|
| Part | Composition               | (B)-1 | (B)-2 | (B)-3 | (B)-4 |
| 1    | A174                      | 40    | 20    | 10    | 30    |
|      | Styrene                   | 15    | 15    | 15    | 10    |
|      | Cyclohexyl methacrylate   | 17    | 27    | 20    | 20.5  |
|      | 2-Ethylhexyl acrylate     | 15    | 15    | 15    | 20    |
|      | Methyl methacrylate       |       | 7.5   | 7.5   |       |
|      | n-Butyl methacrylate      |       | 10    | 17.5  |       |
|      | 2-Hydroxyethyl methacrylate | 13  | 6.5   | 4.5   | 4.5   |
|      | Glycidyl methacrylate     |       |       | 20    | 15    |
|      | Solvesso 100              | 8.2   | 8.2   | 8.2   | 8.2   |
|      | 1-Butanol                 | 5.5   | 5.5   | 5.5   | 5.5   |
|      | V-59                      | 4.75  | 4.75  | 4.75  | 4.75  |
| 2    | Solvesso 100              | 15.6  | 15.6  | 15.6  | 15.6  |
|      | 1-Butanol                 | 10.4  | 10.4  | 10.4  | 10.4  |
| 3    | Xylene                    | 5     | 5     | 5     | 5     |
|      | V-59                      | 0.25  | 0.25  | 0.25  | 0.25  |
| 4    | Methyl orthoacetate       | 4     | 4     | 4     | 4     |
|      | Methanol                  | 2     | 2     | 2     | 2     |
| Solid concentration (%)          | 64   | 65   | 65   | 65   |
| Number average molecular weight  | 5000 | 5200 | 5300 | 5100 |
| Alcoholic hydroxy equivalent     | 1000 | 2000 | 2890 | 2889 |
| Hydrolyzable silyl equivalent    | 620  | 1240 | 2480 | 821  |
| Epoxy equivalent                 |      |      | 710  | 947  |

A174: γ-trimethoxysilylpropyl methacrylate [product of Nippon Unicar]
V-59: 2,2'-azobis(2-methylbutyronitrile) [product of Wako Pure Chemical Industries]

Examples 1 to 11 and Comparative Examples 1 to 3

In Examples 1 to 10 and Comparative Examples 1 to 3, the polymers or compounds specified in Table 6 or 7 were compounded together in the respective proportions shown in Table 6 or 7 on the solid matter basis.

In each of Examples and Comparative Examples, 2 parts by weight of the ultraviolet absorber Tinuvin 384 and 1 part by weight of the light stabilizer Tinuvin 123 (products of Ciba Geigy) were further added per 100 parts by weight of the total resin solids.

Further, in each of Examples and Comparative Examples, the corresponding composition with 0.4 part by weight of a leveling agent (DisperlonL-1984-50; product of Kusumoto Kasei) added per 100 parts by weight of the total resin solids and the composition without addition of the leveling agent were prepared.

This mixture was diluted with Solvesso 100 (petroleum-derived aromatic solvent; product of Exxon Chemical) by a Ford cup to result in viscosity of about 20 to 25 seconds and to give a top coat clear coating composition.

In Example 11, 80 parts by weight of (B)-3, the component (B) obtained in Synthesis Example 5, and 10 parts by weight (as solid matter) of the component (C) MS56S (product of Mitsubishi chemical) were mixed up in advance and the mixture was diluted with Solvesso 100 (petroleum-derived aromatic solvent; product of Exxon Chemical) to a solid concentration of 60% by weight. This solution was matured at 50° C. for 4 hours to give a mixed solution, (E)-1, comprising the components (B) and (C).

The obtained component (E)-1 was compounded with the other components in the solid-basis proportions shown in Table 6, and, the composition with 0.4 part by weight of a leveling agent (DisperlonL-1984-50; product of Kusumoto Kasei) added per 100 parts by weight of the total resin solids and the composition without addition of the leveling agent were prepared, to give a top coat clear coating composition.

Test specimens were prepared by applying an epoxyamide-based cationic electrodeposition primer for automobiles and an intermediate surfacer to degreased and phosphated soft steel sheets. These were coated with a commercial acrylic melamine resin coating (black base coat; for stain resistance evaluation, white base coat).

Then, the above-mentioned top coat clear coating composition was applied in the wet-on-wet manner and, after 20 minutes of setting, baking was carried out at 140° C. for 30 minutes.

The dry film thickness was about 15 μm for the base coat and about 50 μm for the clear top coat.

The coat films thus obtained were evaluated for typical physical properties (1. appearance characteristics; 2. heat curability; 3. acid resistance; 4. scratch resistance; 5. stain resistance; 6. hydrophilicity; 7. accelerated weather resistance) by the methods mentioned below.

The results thus obtained are shown in Tables 6 and 7.

1. Appearance Characteristics

Each coat film was evaluated for image sharpness or clarity using an image claritymeter (product of Suga Shikenki; model ICM-1DP; slit width: 1 mm). The higher the sharpness value, the better the appearance is.

2. Heat Curability (Gel Fraction)

Each top coat clear coating composition was applied to a tin foil and baked at 120° C. for 30 minutes, and the thus-obtained free clear film having a thickness of about 40 μm was cut to a size of about 50×50 mm and wrapped up in a 200-mesh stainless steel wire gauze accurately weighed beforehand ($W_0$) and the whole was accurately weighed ($W_1$). Then, the whole was immersed in acetone for 24 hours. After this extraction procedure, the whole was dried and accurately weighed ($W_2$), and the gel fraction was calculated as follows:

Gel fraction (%)={($W_2$−$W_0$)/($W_1$−$W_0$)}×100

3. Acid Resistance 0.5 cc of 10% aqueous sulfuric acid was dropped onto a test sheet using a pipet. After heating at 80° C. for 30 minutes in a drier, the aqueous sulfuric acid was washed off with water. Then, the coat film surface was observed for changes in appearance and evaluated according to the following criteria.

10 points: No change as compared with the state before testing
9 points: Slight change is observed
8 points: A circular mark remains
7 points: Slight discoloration and/or blistering is observed
5 points: Luster reduction and/or discoloration is evident
1 point : Film dissolution is observed 4. Scratch Resistance (Gloss Retention)

The test specimen (150 mm×100 mm) provided with a coating was fixed horizontally and coated with an abrasive agent (a mixture of 1.2% by weight of JIS Class 8 loam, 1.2% by weight of JIS Class 11 loam, 0.6% by weight of kaolin, 1% by weight of a neutral detergent and 96% by weight of water) at a coating weight of about 0.05 g/cm², and a weight covered with kraft paper (contact surface diameter: 5 cm; load: 22 g/cm²) was caused to stroke the surface.

The 20° gloss of the coat film surface was measured before and after 20 strokes by the weight using a gloss meter (product of MINOLTA; model GM-268). The gloss retention (%) after 20 strokes was calculated as follows:

Gloss retention (%)=(gloss after stroking/gloss before stroking)×100

The higher the gloss retention, the better the scratch resistance is.

5. Stain Resistance

In Settsu City, Osaka Prefecture, Japan, outdoor exposure (southern, 300°) was carried out for 6 months. The staining after exposure was evaluated by the eye.
Evaluation Criteria ○: Staining is almost inconspicuous
Δ: Slight staining
X: Considerable staining 6. Hydrophilicity The hydrophilicity evaluation was performed by measuring the contact angle with water before and after outdoor exposure (southern, 30°) in Settsu City, Osaka Prefecture, Japan, using a contact angle meter (product of Kyowa Kaimen Kagaku; model CA-S150). The smaller the value, the higher the hydrophilicity is.

7. Accelerated Weather Resistance

According to JIS K 5400, weather resistance evaluation was performed using a sunshine carbon arc weatherometer (product of Suga Shikenki).

Test conditions: black panel temperature 63±3° C., 18 minutes of raining during 120 minutes.

After 2,500 hours, the test specimens were evaluated by the eye according to the following criteria.
○: No abnormality
○Δ: Adhesion of water marks or whitening is observed
Δ: Luster reduction and water mark adhesion are evident 8. Storage Stability The components (A), (B) and (C) specified in each of Examples and Comparative Examples were mixed up, 3 parts by weight of methyl orthoacetate was added on the resin solids basis as a dehydrating agent, and the resin solids concentration was adjusted to 50% using Solvesso 100. The resulting mixture was stored in a drier at 50° C. for 10 days and the viscosity was checked.

○: Little change
Δ: An increase in viscosity is observed

TABLE 6

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component (A) | (x)-1 | 60 | | | | 50 | | | | | 60 | |
| | (x)-2 | | 85 | | | | 60 | | | | | 85 |
| | (y)-3 | 40 | | | 25 | | | | | | 40 | |
| | (y)-4 | | 15 | 30 | | | | | | | | 15 |
| | (x)-3 | | | 70 | | | | | | | | |
| | (x)-4 | | | | 75 | | | 60 | 60 | | | |
| | (y)-1 | | | | | 50 | | 40 | 40 | | | |
| | (y)-2 | | | | | | 40 | | | | | |
| | (z)-1 | | | | | | | | | 100 | 100 | |
| Component (C) | MS56S | 10 | 10 | 10 | 5 | 10 | | 5 | 10 | 5 | 10 | |
| | MS151 | | | | | | 20 | | | | | |
| | HAS-1 | 5 | | | | | | | | | | |
| | ESi48 | | | | | | | | 5 | | 5 | |
| Component (B) | (B)-1 | 30 | | 20 | | 20 | 80 | 80 | | 80 | | |
| | (B)-2 | | | | 80 | | | | | | 150 | |
| | (B)-3 | | 80 | | | | | | 25 | | | |
| Component (D) | Tetrabutylammonium bromide | 0.3 | 0.3 | | 0.3 | 0.3 | 0.3 | 0.3 | 0.3 | 0.4 | 0.3 | 0.3 |
| | Dibutyltin dilaurate | | 0.2 | | | | 0.2 | | | 0.2 | | 0.2 |
| Component (E) | (E)-1 | | | | | | | | | | | 90 |
| Appearance. | With leveling agent | 95 | 94 | 96 | 96 | 95 | 96 | 96 | 94 | 95 | 93 | 98 |
| ICM value (1 mm) | No leveling agent | 94 | 94 | 95 | 96 | 93 | 96 | 95 | 95 | 95 | 92 | 98 |
| Gel fraction (%) | | 97 | 98 | 95 | 96 | 97 | 97 | 97 | 95 | 96 | 98 | 98 |
| Acid resistance | | 10 | 10 | 10 | 10 | 10 | 10 | 10 | 10 | 10 | 10 | 10 |
| Scratch resistance (gloss retention) (%) | | 80 | 83 | 81 | 82 | 75 | 78 | 78 | 75 | 77 | 82 | 82 |
| Stain resistance | | ○ | ○ | ○ | ○ | ○ | ○ | ○ | ○ | ○ | ○ | ○ |
| hydnophilicity. | Initial | 67 | 63 | 68 | 65 | 70 | 78 | 74 | 73 | 75 | 69 | 60 |
| contact angle (°) | After exposure | 28 | 26 | 32 | 31 | 33 | 28 | 30 | 28 | 28 | 30 | 25 |
| Accelerated weather resistance | | ○ | ○ | ○ | ○ | ○ | ○ | ○ | ○ | ○ | ○ | ○ |
| Mole ratio (epoxy groups/carboxyl group) | | 1.07 | 1.6 | 1.32 | 1.29 | 1.27 | 1.01 | 1.14 | 1.14 | 1.18 | 1.07 | 1.6 |
| Storage stability | | 1.3 | 1.2 | 1.25 | 1.35 | 1.3 | 1.38 | 1.4 | 1.3 | 1.35 | 2.1 | 1.25 |

TABLE 7

| | | Comparative Example | | |
|---|---|---|---|---|
| | | 1 | 2 | 3 |
| Component (A) | (x)-1 | 60 | | |
| | (y)-3 | 40 | 25 | 15 |
| | (x)-4 | | 75 | |
| Component (C) | MS56S | 10 | | |
| | HAS-1 | | | 30 |
| Component (B) | (B)-2 | | 80 | |
| | (B)-4 | | | 85 |
| Component (D) | Tetrabutylammonium bromide | | 0.3 | |
| | Dibutyltin dilaurate | | | 0.3 |
| Appearance, | With leveling agent | 94 | 94 | 85 |

TABLE 7-continued

|  |  | Comparative Example | | |
|---|---|---|---|---|
|  |  | 1 | 2 | 3 |
| ICM value (1 mm) | No leveling agent | 65 | 45 | 85 |
| Gel fraction (%) |  | 97 | 95 | 97 |
| Acid resistance |  | 10 | 10 | 10 |
| Scratch resistance (gloss retention) (%) |  | 75 | 83 | 89 |
| Stain resistance |  | ○ | X | ○ |
| Hydrophilicity, | Initial | 68 | 80 | 73 |
| contact angle (°) | After exposure | 30 | 72 | 50 |
| Accelerated weather resistance |  | Δ | ○ | ○ |
| Mole ratio (epoxy groups/carboxyl group) |  | 1.07 | 1.29 | 1.21 |
| Storage stability |  | 1.15 | 1.3 | 3.8 |

From the results shown in Tables 6 and 7, it was found that the coatings or coat films formed by using the coating compositions obtained in Examples 1 to 10 were all excellent in, among others, acid resistance, scratch resistance and stain resistance, at the same time, excellent in weather resistance. The coating compositions obtained in Examples 1 to 10 were all excellent in appearance even when no leveling agent was used.

The curable composition for coatings of the present invention show good heat curability and the coat films formed from said composition have good acid resistance, scratch resistance and appearance characteristics, and the physical properties of coatings, such as stain resistance and weather resistance, are well balanced. Therefore, said composition is preferably used in top coat paint compositions for automobiles, industrial equipment, steel furniture, building interior and exterior, household electric appliances, plastics products and the like. In particular, the curable composition for coatings of the present invention is excellent with respect to appearance characteristics and can provide satisfactory appearance characteristics without adding any leveling agent.

Articles coated with the curable composition for coatings of the present invention have such good characteristics as mentioned above.

Furthermore, by blending the resin composition for coatings of the present invention with an acid/epoxy type curable coating composition or paint, a curable composition for coatings capable of providing improved appearance characteristics can be obtained.

What is claimed is:

1. A curable composition for coatings which comprises: a component A consisting of a resin A-1 obtained by mixing an epoxy group-containing compound x component and a carboxyl group-containing compound y component and/or a resin A-2 based on an epoxy group-containing and carboxyl group-containing vinyl copolymer z component, a component B consisting of a vinyl copolymer whose main chain substantially consists of a vinyl copolymer chain and which has, within the molecule thereof, at least one hydrolyzable silyl group bound to a carbon atom as represented by the following general formula I:

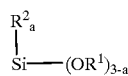

wherein $R^1$ represents a hydrogen atom or an alkyl group containing 1 to 10 carbon atoms, $R^2$ represents a hydrogen atom or a monovalent hydrocarbon group selected from among an alkyl group containing 1 to 10 carbon atoms, an aryl group containing 6 to 10 carbon atoms and an aralkyl group containing 7 to 10 carbon atoms and a represents an integer of 0 to 2, at one main chain terminus and/or on a side chain, and a component C consisting of a silicon compound represented by the following general formula VII:

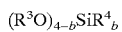  VII wherein $R^3$ represents a hydrogen atom or an alkyl group containing 1 to 10 carbon atoms, an aryl group containing 6 to 10 carbon atoms or an aralkyl group containing 7 to 10 carbon atoms and the $R^3$ groups may be the same or different, $R^4$ represents an alkyl group containing 1 to 10 carbon atoms, an aryl group containing 6 to 10 carbon atoms or an aralkyl group containing 7 to 10 carbon atoms and when there is a plurality of $R^4$ groups, they may be the same or different, and b represents an integer of 0 to 2, and/or a partial hydrolyzate condensate thereof.

2. The curable composition for coatings according to claim 1, which comprises 100 parts by weight of the component A, 1 to 100 parts by weight of the component B and 1 to 100 parts by weight of the component C.

3. The curable composition for coatings according to claim 1, wherein the x component contains at least two epoxy groups per molecule and has an epoxy equivalent of 200 to 2,000 g/mole.

4. The curable composition for coatings according to claim 1, wherein the x component contains at least one hydroxy group per molecule and has a hydroxy equivalent of 500 to 7,000 g/mole.

5. The curable composition for coatings according to claim 1, wherein the x component contains at least one carboxyl group per molecule.

6. The curable composition for coatings according to claim 1, wherein the y component is a vinyl copolymer y-i component containing, on an average, two or more carboxyl groups per molecule.

7. The curable composition for coatings according to claim 6, wherein the y-i component contains at least two epoxy groups per molecule and has an epoxy equivalent of 200 to 2,000 g/mole.

8. The curable composition for coatings according to claim 6, wherein the y-i component contains at least one hydroxy group per molecule and has a hydroxy equivalent of 500 to 7,000 g/mole.

9. The curable composition for coatings according to claim 1, wherein the y component is an oligomer compound y-ii component containing at least two carboxyl groups per molecule and has a molecular weight of not more than 2,000.

10. The curable composition for coatings according to claim 9, wherein the y-ii component is obtained by subjecting a polyol compound and an acid anhydride compound to half esterification.

11. The curable composition for coatings according to claim 1, wherein the z component contains at least one carboxyl group and at least two epoxy groups per molecule and has an epoxy equivalent of 200 to 2,000 g/mole.

12. The curable composition for coatings according to claim 1, wherein the component B contains at least one hydroxy group per molecule and has a hydroxy equivalent of 500 to 7,000 g/mole.

13. The curable composition for coatings according to claim 1, wherein the component B contains at least one epoxy group per molecule and has an epoxy equivalent of 200 to 2,000 g/mole.

14. The curable composition for coatings according to claim 1, wherein the component C consists of a tetraalkyl silicate and/or a partial hydrolyzate condensate thereof.

15. The curable composition for coatings according to claim 1 which further comprises a curing catalyst component D in an amount of 0.001 to 10 parts by weight per 100 parts by weight, on the solid matter basis, of the sum total of the components A, B and C.

16. The curable composition for coatings according to claim 1, wherein the epoxy group to carboxyl group mole ratio in the component A is such that the epoxy group occurs in an amount of 0.2 to 5 moles per mole of the carboxyl group.

17. A coated article provided with a coating comprising a metallic powder and/or color pigment and further provided thereon with a top coat clear coating comprising, as the main component, the curable composition for coatings according to claim 1.

18. A resin composition for coatings which is intended for producing a curable composition for coatings by blending with a composition for coatings which comprises a component A consisting of a resin A-1 obtained by mixing an epoxy group-containing compound x component with a carboxyl group-containing compound y component and/or a resin A-2 based on an epoxy group-containing and carboxyl group-containing vinyl copolymer z component, wherein said resin composition for coatings comprises a component B consisting of a vinyl copolymer whose main chain substantially consists of a vinyl copolymer chain and which has, within the molecule thereof, at least one hydrolyzable silyl group bound to a carbon atom as represented by the following general formula I:

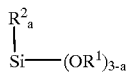

I wherein $R^1$ represents a hydrogen atom or an alkyl group containing 1 to 10 carbon atoms, $R^2$ represents a hydrogen atom or a monovalent hydrocarbon group selected from among an alkyl group containing 1 to 10 carbon atoms, an aryl group containing 6 to 10 carbon atoms and an aralkyl group containing 7 to 10 carbon atoms and a represents an integer of 0 to 2, at one main chain terminus and/or on a side chain, and a component C consisting of a silicon compound represented by the following general formula VII:

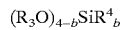

VII wherein $R^3$ represents a hydrogen atom or an alkyl group containing 1 to 10 carbon atoms, an aryl group containing 6 to 10 carbon atoms or an aralkyl group containing 7 to 10 carbon atoms and the $R^3$ groups may be the same or different, $R^4$ represents an alkyl group containing 1 to 10 carbon atoms, an aryl group containing 6 to 10 carbon atoms or an aralkyl group containing 7 to 10 carbon atoms and when there is a plurality of $R^4$ groups, they may be the same or different, and b represents an integer of 0 to 2, and/or a partial hydrolyzate condensate thereof.

19. The resin composition for coatings according to claim 18, wherein 1 to 100 parts by weight of the component B and 1 to 100 parts by weight of the component C are blended with said composition for coatings comprising 100 parts by weight of the component A.

* * * * *